(12) United States Patent
Jagodzinski

(10) Patent No.: US 11,967,875 B2
(45) Date of Patent: Apr. 23, 2024

(54) ELECTROMAGNETIC LINEAR ACTUATOR

(71) Applicant: Nui Lab GmbH, Schorndorf (DE)

(72) Inventor: Ron Jagodzinski, Schwabisch Gmund (DE)

(73) Assignee: Nui Lab GmbH, Schorndorf (DE)

( * ) Notice: Subject to any disclaimer, the term of this patent is extended or adjusted under 35 U.S.C. 154(b) by 476 days.

(21) Appl. No.: 17/269,567

(22) PCT Filed: Aug. 21, 2019

(86) PCT No.: PCT/EP2019/072351
§ 371 (c)(1),
(2) Date: Feb. 19, 2021

(87) PCT Pub. No.: WO2020/038988
PCT Pub. Date: Feb. 27, 2020

(65) Prior Publication Data
US 2021/0328492 A1    Oct. 21, 2021

(30) Foreign Application Priority Data

Aug. 21, 2018  (DE) .................... 10 2018 214 102.9

(51) Int. Cl.
*H02K 33/16* (2006.01)
(52) U.S. Cl.
CPC .................................. *H02K 33/16* (2013.01)
(58) Field of Classification Search
CPC ......... H02K 33/16; H02K 33/14; H02K 33/18
See application file for complete search history.

(56) References Cited

U.S. PATENT DOCUMENTS

| | | | |
|---|---|---|---|
| 3,538,358 A | 11/1970 | Bauerle | |
| 7,554,225 B2 * | 6/2009 | Kraus | H02K 33/18 |
| | | | 310/15 |
| 7,768,160 B1 | 8/2010 | Sahyoun | |
| 2006/0208600 A1 * | 9/2006 | Sahyoun | H02K 33/16 |
| | | | 310/254.1 |
| 2008/0001484 A1 | 1/2008 | Fuller et al. | |

(Continued)

FOREIGN PATENT DOCUMENTS

| | | |
|---|---|---|
| CN | 104638871 A | 5/2015 |
| DE | 10355446 A1 | 6/2005 |

(Continued)

*Primary Examiner* — Robert W Horn
(74) *Attorney, Agent, or Firm* — The Webb Law Firm

(57) ABSTRACT

An electromagnetic linear actuator, which comprises a first and a second element. One element is a magnetic oscillator with at least one magnet, and the other element is a magnetic stator with at least one magnet. The two elements are movable relatively linearly to one another and the magnetization directions of the oscillator and of the stator are parallel. Either the stator comprises two opposing identical stator poles or the oscillator comprises two opposing identical oscillator poles. Furthermore, a method for producing a mechanical movement by means of an actuator. Either magnetization of a stator of the actuator takes place such that the stator comprises two opposing identical stator poles, or magnetization of an oscillator of the actuator takes place such that the oscillator comprises two opposing identical oscillator poles.

15 Claims, 11 Drawing Sheets

(56) References Cited

U.S. PATENT DOCUMENTS

| | | | |
|---|---|---|---|
| 2009/0134721 A1* | 5/2009 | Zimmerling | H02K 35/02 |
| | | | 310/15 |
| 2011/0239383 A1 | 10/2011 | Nishiura | |
| 2013/0169071 A1 | 7/2013 | Endo et al. | |
| 2015/0200582 A1* | 7/2015 | Headstrom | H02K 33/16 |
| | | | 310/25 |
| 2015/0236353 A1 | 8/2015 | Meunier et al. | |
| 2018/0123437 A1* | 5/2018 | Khoshkava | H02K 1/223 |
| 2021/0328492 A1* | 10/2021 | Jagodzinski | H02K 33/16 |

FOREIGN PATENT DOCUMENTS

| | | |
|---|---|---|
| EP | 2374430 B1 | 10/2016 |
| EP | 3318957 B1 | 10/2019 |
| JP | H05-284714 A | 10/1993 |
| JP | H11168869 A | 6/1999 |
| JP | 2004343931 A | 12/2004 |
| WO | 2015149684 A1 | 10/2015 |

\* cited by examiner

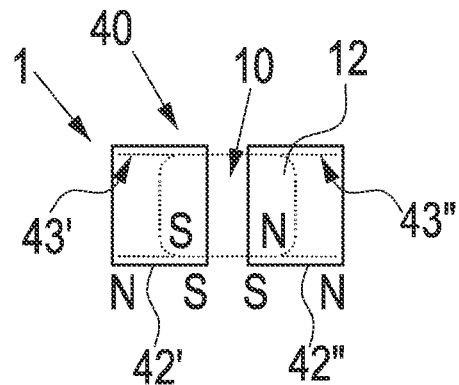
Fig. 3
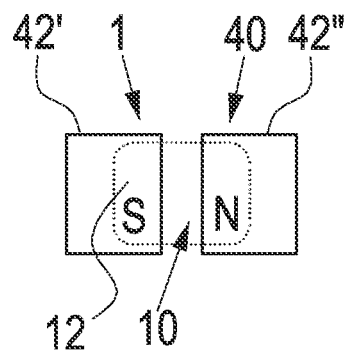
Fig. 4 I
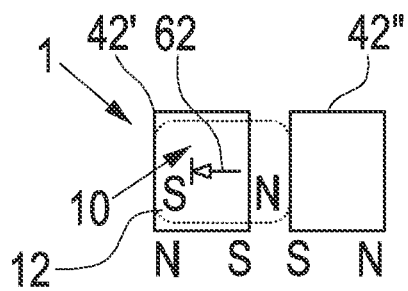
Fig. 4 II
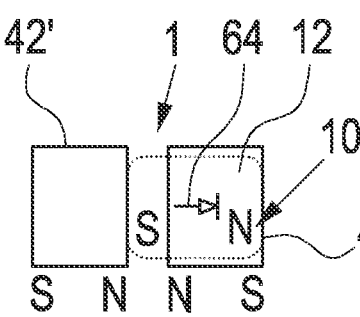
Fig. 4 III

ELECTROMAGNETIC LINEAR ACTUATOR

CROSS-REFERENCE TO RELATED APPLICATIONS

This application is the United States national phase of International Application No. PCT/EP2019/072351 filed Aug. 21, 2019, and claims priority to German Patent Application No. 10 2018 214 102.9 filed Aug. 21, 2018, the disclosures of which are hereby incorporated by reference in their entirety.

BACKGROUND OF THE INVENTION

Field of the Invention

The invention relates to an electromagnetic linear actuator and a method for producing a mechanical movement, in particular a vibration, by means of an actuator.

Description of Related Art

Linear actuators are used as standard to produce mechanical movements. A mechanical movement is preferably a continuous linear movement, for example a displacement of objects relative to one another. For example, the function of a linear motor can be executed hereby and objects thus put into translatory motions, for example. It is also possible to produce a vibration and thus a haptic (and/or acoustic) signal by means of the mechanical movement. The possibility further exists of performing individual, singular linear movements by means of electromagnetic actuators. Final control elements, for example, can be created hereby and thus the function of a switch or a valve can be triggered.

At present, solenoid actuators are frequently used as linear actuators. An exemplary solenoid actuator 100 of the prior art is depicted in FIG. 1. The solenoid actuator 100 comprises a stator 40 and an oscillator 10 arranged inside this stator. The stator 40 comprises an electromagnet 42, implemented as a coil, in the form of a hollow cylinder with a circular base. In contrast, the oscillator 10 comprises a permanent magnet 12, which has a solid cylindrical form. The permanent magnet 12 is a rod magnet with one pole 14 in the form of a south pole on one side and an opposite pole 16 in the form of a north pole on the other side. When the electromagnet 42 is magnetized, in particular when a current flows through the coil, this has a magnetic pole 44 on one side and a magnetic pole 46 opposed to the first magnetic pole on the other side. In the embodiment depicted, current flows through the coil such that the pole 44 is a north pole and the pole 46 is a south pole. Permanent magnets 12 and electromagnets 42 accordingly have linear magnetization directions, which are parallel to one another and lie inside one another, but are opposed according to direction. Due to the attraction of opposite poles of the permanent magnet 12 and the electromagnet 42, the permanent magnet moves along the arrow 60 relative to the electromagnet 42. A mechanical movement hereby takes place that can be used for the function of a final control element, for example. If following an in particular complete movement of the permanent magnet 12 in the direction of the arrow 60, the direction of the current flow through the electromagnet 42 is reversed, then north and south pole of the electromagnet 42 changes. This results in a reversal of the movement direction 60 of the permanent magnet 12. If a continuous change in current direction takes place, the oscillator 10 with permanent magnet 12 is set in oscillation relative to the stator 40 with electromagnet 42. By means of this continuous mechanical movement a vibration, for example, can be produced.

Such linear actuators of the prior art are characterized by simple manufacture and/or assembly with simple mounting of the magnet. Furthermore, they have a uniform field intensity regardless of the magnet position. Nevertheless, such linear actuators have a large number of disadvantages. For example, there is only a low field intensity between magnet and coil. Furthermore, a small number of windings exists with constant resistance. This is due to the fact that the electric resistance is dependent among other things on the wire length of the coil, but the field strength is dependent on the number of turns.

SUMMARY OF THE INVENTION

The object of the invention is to create an optimized electromagnetic linear actuator. Another object of the invention consists in creating an improved method for producing a mechanical movement, in particular a vibration.

The object is achieved according to the invention by an electromagnetic linear actuator according to claim 1 and by a method for producing a mechanical movement according to claim 22.

The electromagnetic linear actuator according to the invention comprises a first and a second element. One of the elements, in particular the first element, is a magnetic oscillator with at least one magnet. The other element, in particular the second element, is a magnetic stator with at least one magnet. The at least one magnet of the oscillator and/or of the stator can be on the one hand a magnet that is already magnetized in the initial state and thus has a north pole and a south pole. On the other hand, however, it can also be a device such as an electromagnet, for example, which does not yet have any magnetization in the initial state. In this case the magnetization only takes place due to a further step, which ensures that a magnetic field is formed. If it is an electromagnet in the form of a coil, for example, a current flow through the coil forms the magnetic field. If the oscillator and/or the stator have several magnets, it is preferable that all magnets of the oscillator and/or the stator respectively have parallel magnetization directions. It is particularly preferable that the magnetization directions lie inside each other and are thus identical, but independent of direction. The first element and the second element are formed to be movable linearly relative to one another. If relative attraction or repulsion of the first and second element occurs, for example, the first element and the second element move relative to one another, preferably towards one another or away from one another. The magnetization directions of the oscillator and the stator are parallel to one another. It is particularly preferable that the magnetization directions of the oscillator and the stator lie inside each other. Lying inside each other here again means that the magnetization directions are identical but independent of direction. Either the stator or the oscillator comprises two opposing identical poles. Identical poles are either two south poles or two north poles. Opposing in this case means in particular that the two poles are adjacent to one another and so an arrangement of opposite polarity exists. In a particularly preferable embodiment, for example, either the stator or the oscillator comprises two magnets of opposite polarity. In this case, the two north poles or the two south poles of these two magnets lie with their ends opposite one another, for example, so that two magnets repel one another. Removal of the two magnets relative to one another due to repulsion can preferably be prevented by fixing the two magnets relative to one another. An alternative or additional definition to the either opposing identical stator poles or oscillator poles consists in either the oscillator or the stator having a singular pole centrally. Thus the oscillator or the stator comprises only a north pole or a south pole centrally.

It is preferable that the electromagnetic linear actuator is implemented such that a change in the magnetization of stator or oscillator takes place. Due to the change in magnetization of stator or oscillator, a relative movement occurs between oscillator and stator and thus preferably a mechanical movement. It is particularly preferable that the electromagnetic linear actuator is implemented such that this change in magnetization takes place permanently or continuously. If the stator or the oscillator thus comprises electromagnets, for example, the electromagnetic linear actuator is implemented so that the current flow through the electromagnets is reversed and consequently the poles of the electromagnets change. The change in magnetization, preferably the change in the current flow, takes place in particular by means of one or more current sources and/or one or more control devices which the electromagnetic linear actuator according to the invention comprises in a preferred embodiment. The current sources can be batteries and/or rechargeable batteries and/or the electricity grid, for example.

It is preferable that the first element is arranged at least partly inside the second element. In particular, the first element is arranged completely inside the second element in this case, so that the outer dimensions of the first element are arranged completely inside the inner dimensions of the second element. If the second element is a hollow cylinder, for example, the first element, which is preferably formed as a solid cylinder, is located inside the inner shell surface of the hollow cylinder and does not protrude beyond the two bases of the hollow cylinder. In the case of just a partial arrangement of the first element inside the second element, the second element contains the first element preferably at least circumferentially. If the second element is once again a hollow cylinder here, for example, then the first element, preferably formed as a solid cylinder, is located inside the inner shell surface of the hollow cylinder, thus circumferentially enclosed by the second element, but it is possible that the first element protrudes from the hollow cylinder at one or both bases, for example.

In a preferred embodiment, the first element is formed substantially cylindrically. The cylindrical shape corresponds here to a circular cylindrical shape, for example, but other cylindrical shapes such as rectangular or prism shapes, for example, are also possible. It is preferable that the first element comprises the magnetic poles in the area of the cylinder bases, preferably in the center of the cylinder bases. With regard to the cylindrical design of the first element, it is preferable that the first element has an axial magnetization, preferably along the axis of symmetry of the cylinder extending along the height. The first element preferably has a uniform cylindrical shape. In particular, the shape of the first element is symmetrical with reference to at least one plane of symmetry, preferably the transverse plane.

In a preferred embodiment, the second element is formed substantially as a hollow cylinder. The hollow cylinder shape here corresponds, for example, to a hollow circular cylindrical shape, but other hollow cylindrical shapes are also possible, such as rectangular or prism shapes. It is preferable that the second element has the magnetic poles in the area of the cylinder bases, preferably in the center of the cylinder bases. With regard to the hollow cylindrical design of the second element, it is preferable that the second element has an axial magnetization, preferably along the axis of symmetry of the hollow cylinder extending along the height. The second element can have a uniform cylindrical shape. In particular, the shape of the second element can be symmetrical with reference to at least one plane of symmetry, preferably the transverse plane. It is particularly preferable, however, that the second element is not uniform. The shape of the hollow cylinder comprises here in particular a hollow cylindrical shape that is open on one or both longitudinal sides, but hollow cylindrical shapes that are closed on one or both sides are also possible. It is accordingly preferable that the hollow cylinder is hollow at least in the interior.

In a preferred embodiment, the second element comprises two hollow, preferably identical, half-cylinders, wherein the second element consists in particular hereof. Half-cylinder preferably means in this case the longitudinally split half of a cylinder. It is particularly preferable that the cylinder or the half-cylinder has substantially a rectangular or semi-rectangular form. It is preferable that the half-cylinders are connected to one another and preferably form the second element in this way. In this case the two hollow cylinders connected to one another together form in particular a substantially hollow cylindrical element. In particular, the two open sides of the half-cylinders face one another when they are connected. The two half-cylinders are preferably arranged parallel to one another. The two half-cylinders are particularly preferably arranged offset by 180° to one another. This offset of the two half-cylinders to one another, thus the 180° rotation, is performed in this case in particular about the transverse axis of the half-cylinders. It is preferable that the half-cylinders are closed on one side. In the case of half-cylinders closed on one side and an offset of 180°, it is preferable that the connected half-cylinders thus form a hollow cylindrical shape of the second element that is closed on both sides. It is preferable that the two half-cylinders can be slid inside one another and that a connection is preferably made hereby. In addition or alternatively, it is also possible that the half-cylinders engage with one another.

It is preferable that the second element, preferably on the inside, particularly preferably on the inner hollow cylindrical shell surface, has a ribbed profile with at least one rib. The rib profile is preferably arranged in a longitudinal direction, in particular parallel to the longitudinal axis of the second element. It is hereby advantageously possible in particular to minimize the friction between the elements and/or facilitate air circulation in the interior in the case of a movement of the first element relative to the second element.

In the case of a cylindrical configuration of the first element and a hollow cylindrical configuration of the second element, it is preferable that the first element and the second element are coaxial relative to one another.

In particular, at least one of the magnets, preferably the at least one oscillator magnet, is a permanent magnet. A permanent magnet is also termed a permanent magnet. The permanent magnet can be designed in particular in the form of a rod magnet, preferably cylindrically and particularly preferably circular-cylindrically.

It is preferable that at least one of the magnets, in particular the at least one stator magnet, is an electromagnet. Implementation in particular as a coil is preferable here as electromagnet.

In a preferred embodiment, the second element comprises at least two magnets arranged at the ends and coaxially with one another. The magnets in this case are preferably designed as a hollow cylinder and particularly preferably as a hollow circular cylinder. In the coaxial arrangement at the ends, the magnets are preferably implemented with opposite polarity to one another. It is particularly preferable that the second element comprises exactly two magnets. In a preferred implementation, the two magnets of the second element are realized integrally. In the integral implementation it is particularly preferable that the two magnets are formed from a preferably single coil, wherein the coil, in particular centrally, has a change of winding direction. It is preferable in this case that accordingly one magnet is on one side of the change of winding direction and the other magnet is on the other side of the change of winding direction. Preferably two identical poles, thus two north poles or two south poles, of the two magnets accordingly lie opposite in the area of the change of winding direction.

In particular, the electromagnetic linear actuator according to the invention comprises at least one end element on one side, preferably in the outer end region of the linear actuator. It is particularly preferable that the electromagnetic linear actuator according to the invention comprises at least one end element on both sides of the electromagnetic linear actuator. The at least one end element is located in particular arranged at the outer end region of the second element. In the case of an arrangement at the outer end region of the second element, it is preferable that the end element is arranged on the face of the second element.

The at least one end element preferably comprises at least one magnet. The magnet is preferably axially magnetized in this case and the direction of magnetization lies in particular parallel, particularly preferably inside, the directions of magnetization of the oscillator and/or of the stator. The at least one magnet of the at least one end element is preferably implemented as an electromagnet.

In the implementation of the at least one end element with at least one magnet, it is preferable that this magnet has the same polarity as or the opposite polarity to the pole of the element, in particular the second element, on which this end element is arranged. For example, if the end element is thus on the second element, preferably implemented as a stator, then two identical opposed poles of the end element and the second element lie opposite one another.

If the at least one magnet of the at least one end element is an electromagnet, it is preferable that the electromagnet has alternating polarity such that the change in polarity is synchronous with the change in the element on which the end element is arranged. If an end element is arranged according to this on the second element, for example, wherein the second element is the stator, and if the stator changes its polarity, then the at least one magnet of the corresponding end element likewise changes its polarity synchronously herewith, so that in this case a state of the end element that is of the opposite polarity to or same polarity as the element associated with the end element preferably exists.

It is preferable that the at least one end element is formed as a cover or as a hollow cylinder. The end element is formed in this case in particular integrally with the element on which this end element is arranged. If the end element is a cover, which is arranged on the second element, for example, which is formed as a hollow cylinder, it is preferable that the cover closes the hollow cylinder. In an integral design of cover and hollow cylinder, the cover and hollow cylinder preferably form a type of pot shape. If the second element corresponds to the stator in coil form, a type of pot-shaped coil in particular is formed hereby. In a preferred configuration of the electromagnetic linear actuator in which the second element, formed as a stator, comprises two coils arranged coaxially at the ends relative to one another, a cover is arranged at each of the two open coil sides so that two cylindrical pots are created, which are associated with one another by their open sides. If the at least one end element is a hollow cylinder, this preferably rests at the end and coaxially on the element on which this end element is arranged. If this element is a hollow cylinder, then a type of extended hollow cylinder is created with or without an interruption in between, the two hollow cylinders preferably having the same diameter. In the design of the end element as a cover on a hollow cylinder, an object located inside the hollow cylinder, for example the oscillator, cannot penetrate the cover and thus exit the hollow cylinder on this side. In a design of the end element as a hollow cylinder, on the other hand, an object arranged inside the hollow cylinder, for example the oscillator, can at least partly penetrate into the hollow cylinder of the end element and thus at least partly exit the element associated with this end element. A combination of cover and hollow cylinder is also possible so that in particular a cover is arranged on one side and a hollow cylinder on the other side. It is preferable that the at least one end element has at least partly a smaller circumference than the element on which this end element is arranged. The at least one end element particularly preferably has a T-shaped cross section, wherein it is preferable that the longitudinal member (|) of the T-shape is connected, preferably integrally, to the element on which this end element is arranged. It is accordingly preferable that the transverse member (⁻) of the T-shape is spaced from the element on which this end element is arranged by way of the longitudinal member. In a preferred implementation, the magnet of the at least one end element is implemented as a coil, which is wound around the longitudinal member of the T-shape.

It is preferable that the magnets of the at least one end element and of the second element are formed integrally. It is particularly preferable that the magnets are formed by one, in particular single, coil.

In the case of a smaller diameter of a coil, more turns can be realized with the same wire length (same resistance) and the field strength thus increased. Since the coil encloses the oscillator, in particular with permanent magnets, however, this can only be realized at the end regions of the stator. On the other hand, the field strength decreases considerably as the distance increases. An implementation of the linear actuator with a magnetic stator in the form of a hollow cylinder and with an end element is thus advantageous, for example as compared with an implementation with a magnetic stator only with end element.

It is preferable that the electromagnetic linear actuator according to the invention comprises a vibration-damping device for damping vibrations of the first element relative to the second element. For example, only damping of the movement of the first element relative to the second element, for example above a certain movement radius of the first element relative to the second element, can take place hereby on the one hand. On the other hand, it is also possible hereby that the freedom of movement of the first element is restricted relative to the second element. It is preferable that the vibration-damping device is formed integrally with the second element.

The vibration-damping device preferably comprises at least one vibration damper on one side, preferably at least one vibration damper on both sides, between the first and the second element. Arrangement on one side or both sides means the outer regions of the elements in this case. If the second element, which is in particular the stator, has substantially a hollow cylindrical shape, for example, and if the first element, which is preferably the oscillator, in particular in the form of a cylinder, is arranged inside the hollow cylinder, then at least one vibration damper is located in the region of a base of the hollow cylinder, wherein the vibration damper acts to damp the cylinder. In the aforesaid example it is preferable that the hollow cylinder comprises at least one vibration damper on each of the two bases, which dampers act on the cylinder and consequently hold the cylinder in a cushioning manner inside the hollow cylinder.

At least one of the vibration dampers is preferably a spring, in particular realized as a helical spring, or a magnetic damper or a gas pressure damper or a hydraulic damper or an, in particular elastic, impact element. If the electromagnetic linear actuator comprises several vibration dampers, any combination of the types of vibration damper is possible. If the vibration damper is a gas pressure damper, this can comprise a membrane, within which the gas used for damping is arranged. In addition or alternatively, the gas pressure damper can comprise valves, in particular adjustable valves.

It is preferable that the electromagnetic linear actuator according to the invention comprises a push-rod device, preferably connected to the first element, to transmit a force from the electromagnetic linear actuator to the environment. The push-rod device consists in this case of at least one push rod, in particular two push rods. The push-rod device can interact for damping purposes, for example, with damping elements arranged outside the electromagnetic linear actuator or will serve to transmit a mechanical force to the environment of the electromagnetic linear actuator.

In particular, the first and/or the second element of the electromagnetic linear actuator according to the invention comprises at least one iron core and/or at least one iron casing. For example, it is possible in this case, in the design of the first element as an oscillator in the form of one or more permanent rod magnets, that the rod magnet comprises an iron core centrally or that an iron core is located between two rod magnets, for example of opposing polarity. On the other hand, it is possible in the context of the iron casing that the rod magnet comprises iron elements on both sides, for example in the form of facings. It is preferable that either the first element or the second element comprises at least two magnets of opposing polarity arranged in series. Two identical poles consequently lie opposite each other on the at least two magnets. In a preferred implementation, the electromagnetic linear actuator according to the invention is configured here such that if the first element comprises at least two magnets of opposing polarity arranged in series, then the second element comprises no magnets of opposing polarity arranged in series, and vice versa. If the implementation of the electromagnetic linear actuator according to the invention is such, for example, that the second element comprises two coils, which lie arranged coaxially with one another, then two north poles or two south poles face each other. If more than two coils, for example three coils, are present according to the above example, then at the points at which the coils face one another, two north poles or two south poles respectively lie opposite one another.

It is preferable that either the stator comprises two identical stator poles on both sides externally, or the oscillator comprises two identical oscillator poles on both sides externally. In the implementation in which the stator comprises two identical stator poles on both sides externally, it is preferable that the stator comprises a singular pole centrally as a whole, for example on account of two opposing identical poles there. In the implementation in which the oscillator comprises two identical oscillator poles on both sides externally, this is accordingly reversed. Furthermore, it is preferable that when the stator comprises two identical stator poles on both sides externally, an identical and a reversed oscillator pole respectively face these identical stator poles. This is implemented correspondingly again in the implementation in which the oscillator comprises two identical oscillator poles on both sides externally.

The method according to the invention for producing a mechanical movement is in particular a method for producing a vibration. The method is carried out by means of an actuator. This actuator comprises a first and a second element, wherein one, in particular the first, element is a magnetic oscillator with at least one magnet, and the other, in particular the second, element is a magnetic stator with at least one magnet. Furthermore, the actuator is implemented such that the magnetization directions of the oscillator and the stator are parallel and preferably lie inside one another. The method comprises the step of magnetization, wherein either the stator is magnetized such that the stator comprises two opposing identical stator poles, or the oscillator is magnetized such that the oscillator comprises two opposing identical oscillator poles. The step of magnetization preferably takes place by means of introducing current into the at least one magnet of the oscillator or into the at least one magnet of the stator, wherein these magnets are electromagnets in particular. The current is preferably introduced by means of a current source and/or control device. It is also possible that the stator or oscillator that was not magnetized such that it comprises two opposing identical poles is likewise magnetized. In this case, however, magnetization is preferred such that different opposing poles or a north pole on one side and a south pole on the other side result.

The method according to the invention preferably comprises a change of magnetization either of the oscillator such that a reversal of the oscillator poles takes place, or of the stator such that a reversal of the stator poles takes place. Starting out in particular from the resting position between oscillator and stator, a relative movement can take place due to this magnetization change between oscillator and stator due to the changing magnetic attraction. It is preferable that the change of magnetization takes place permanently or continuously so that a permanent or continuous oscillation of oscillator relative to stator takes place.

In a preferred embodiment, the actuator used for the method further comprises an end element arranged in particular coaxially with the second element, at least on one side, preferably on both sides, of the second element with at least one, in particular axially magnetized, magnet. In the context of the method according to the invention, the further step preferably takes place here of magnetization of this at least one magnet of the end element such that either identical or opposed poles of the end element and of the second element are created lying opposite one another. Thus identical polarity or opposed polarity of the end element arises with reference to the opposing second element. The at least one magnet of the at least one end element is preferably an electromagnet here, in particular a coil.

It is preferable that the method according to the invention is carried out by means of an above-mentioned electromechanical linear actuator.

A substantial advantage of the present invention, in particular the embodiment with at least one end element, preferably implemented as a cover, lies in the fact that an extremely strong actuator exists, thus intensive vibrations, for example, can be produced thereby.

Furthermore, the actuator according to the invention makes possible a realistic click sensation, especially in the case of immovable, capacitive user interfaces. Thus a switch characteristic, for example, or the feedback of a switch or similar to a user can be imitated by means of the inventive actuator on surfaces or similar.

An additional aspect of the invention lies in an operating element with an inventive actuator according to the present description. Haptic and/or acoustic signals, which the actuator according to the invention transmits by means of mechanical movement, preferably vibration, in particular to the surface of the operating element, can hereby be emitted to a user operating the operating element.

Another aspect of the invention lies in a bicycle grip or a handlebar of a bicycle with an inventive actuator according to the present description. For example, haptic information from navigation equipment or similar, for example, can be transmitted to the bicycle rider in such a way.

Moreover, another aspect of the invention consists in a chair, in particular a gaming chair, with an inventive actuator according to the present description. Thus on the basis of haptic signals to a user sitting on the chair, preferably in computer games, for example in the case of shots, explosions, etc., the degree of immersion can be enhanced, especially in the context of virtual reality.

BRIEF DESCRIPTION OF THE DRAWINGS

The invention is explained in greater detail below on the basis of preferred embodiments with reference to the enclosed drawing. There is shown.

DETAILED DESCRIPTION OF THE INVENTION

Figure 1:
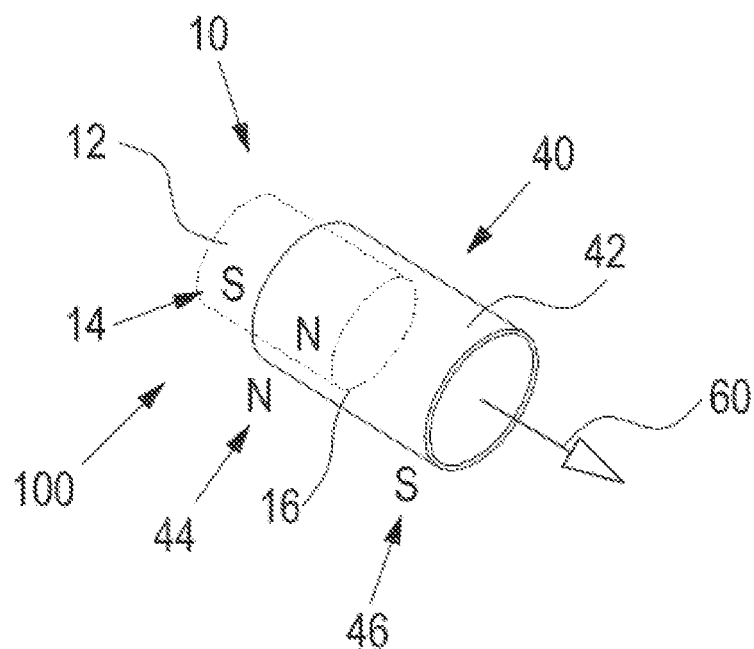
FIG. 1 a view in perspective of a solenoid actuator of the prior art.

Identical elements are identified by the same reference characters in the Figs. For clarity, reference characters are not provided in all Figs., especially where elements have already been identified previously. If identical elements occur several times in an embodiment depicted by a figure, for example because a component is present multiple times, then such elements are differentiated by means of apostrophes.

The solenoid actuator 100 of the prior art from FIG. 1 was already discussed at the beginning.

Figure 2:
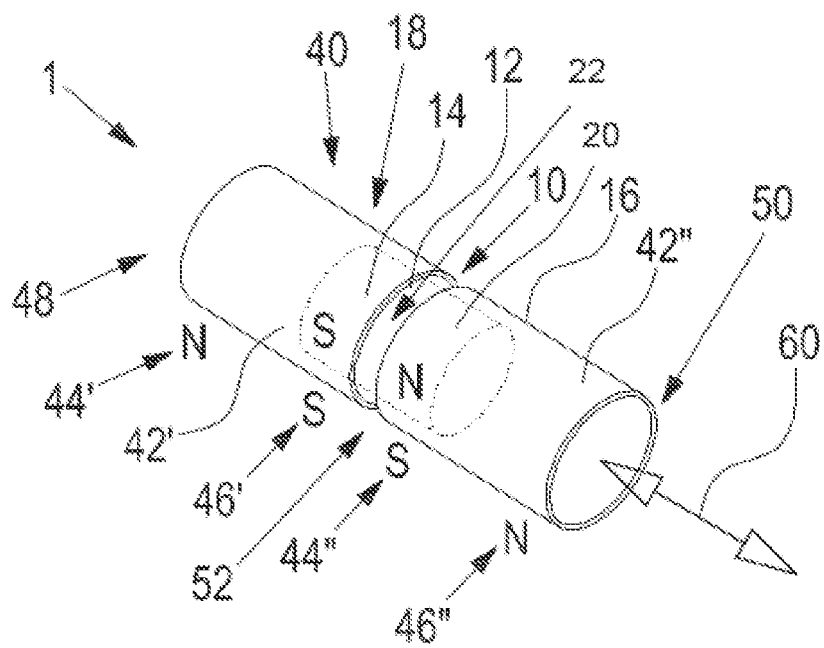
FIG. 2 a view in perspective of an embodiment of the inventive electromagnetic linear actuator, FIG. 3 a schematic sectional view of the electromagnetic linear actuator from FIG. 2, FIG. 4 a schematic sectional views of the electromagnetic actuator from FIG. 2 in motion, FIG. 5 a view in perspective of another embodiment of the inventive electromagnetic linear actuator, FIG. 6 a schematic sectional view of the electromagnetic linear actuator from FIG. 5, FIGS. 7a to 7g schematic sectional views of further embodiments of the electromagnetic linear actuator, FIGS. 8a to 8d schematic sectional views of further embodiments of the electromagnetic linear actuator according to the invention, FIGS. 9a to 9d various views of another embodiment of the electromagnetic linear actuator according to the invention, FIGS. 10a and 10b various views of another embodiment of the electromagnetic linear actuator according to the invention, and FIGS. 11a and 11b various views of another embodiment of the electromagnetic linear actuator according to the invention.

The electromagnetic linear actuator 1 depicted in FIG. 2 comprises an oscillator 10 with a permanent magnet 12. The oscillator 10 corresponds here to the first element of the electromagnetic linear actuator 1. The permanent magnet 12 has the form of a solid cylinder, with a circle as a base. Located on one side 18 of the oscillator is the oscillator pole 14, this being a south pole (S) in this case. Located on the other side 20 of the oscillator accordingly is the other oscillator pole 16, configured as a north pole (N). Due to the implementation of the permanent magnet 12, no magnetic attraction force starts out from the oscillator center 22.

The oscillator 10 is arranged movably in a linear manner inside the stator 40, which represents the second element. The linear mobility is depicted by arrow 60. The stator 40 consists of two electromagnets 42', 42" in the form of a hollow cylinder, which are formed in particular as a coil. In the embodiment depicted, the electromagnet 42' is magnetized in such a way, for example by means of current sources and/or control units that are not depicted, that it comprises a north pole 44' on the side shown on the left and a south pole 46' on the right side. Lying opposite the electromagnet 42' coaxially and at the end face is the electromagnet 42". The electromagnet 42" is magnetized such that this comprises a south pole 44" on the left side and a north pole 46" on the right side. Due to this arrangement of the electromagnets 42', 42", the stator 40 comprises two opposing identical stator poles 46', 44" in the middle, which are each a south pole. The stator 40 accordingly comprises a virtual stator pole in the form of a south pole in the middle 52. If a change in the magnetization of the two electromagnets 42', 42" takes place, so that north and south poles each exchange their position, a linear relative movement along the movement direction 60 takes place due to the magnetic attraction force between stator 40 and oscillator 10. In the case of a permanent or continuous change of magnetization of the electromagnets 42', 42", permanent oscillation occurs, thus a permanent movement back and forth, relatively between oscillator 10 and stator 40. A mechanical movement is triggered hereby, which can correspond to a vibration, for example.

FIG. 3 shows the electromagnetic linear actuator 1 from FIG. 2 in a schematic sectional view. Here the coil 43' of the electromagnet 42' and the coil 43" of the electromagnet 42" can be seen schematically.

FIG. 4 shows three states of the electromagnetic linear actuator from FIG. 2.

I. (FIG. 4) shows the initial state. In the initial state, the electromagnets 42', 42" have no magnetization, as no current flows through them, for example. The oscillator 10 with permanent magnet 12 is accordingly located in the initial position, centrally inside the stator 40.

II. (FIG. 4) shows a magnetization state of the electromagnets 42', 42" which corresponds to the state in FIG. 2. Due to the magnetic attraction force, the oscillator 10 with permanent magnet 12 moves linearly along the movement direction 62, to the left in the form shown.

In magnetization state III. (FIG. 4) a change of magnetization has taken place in the electromagnets 42', 42", so that north pole and south pole have each switched their position. This change leads to the oscillator 10 with permanent magnet 12 completing a linear movement depicted towards the right along the movement direction 64, starting from position II. A permanent change between state II. and state III. leads to continuous oscillation of the oscillator 10 inside the stator 40, so that a mechanical movement results and a vibration, for example, is produced in such a way.

Figure 5:
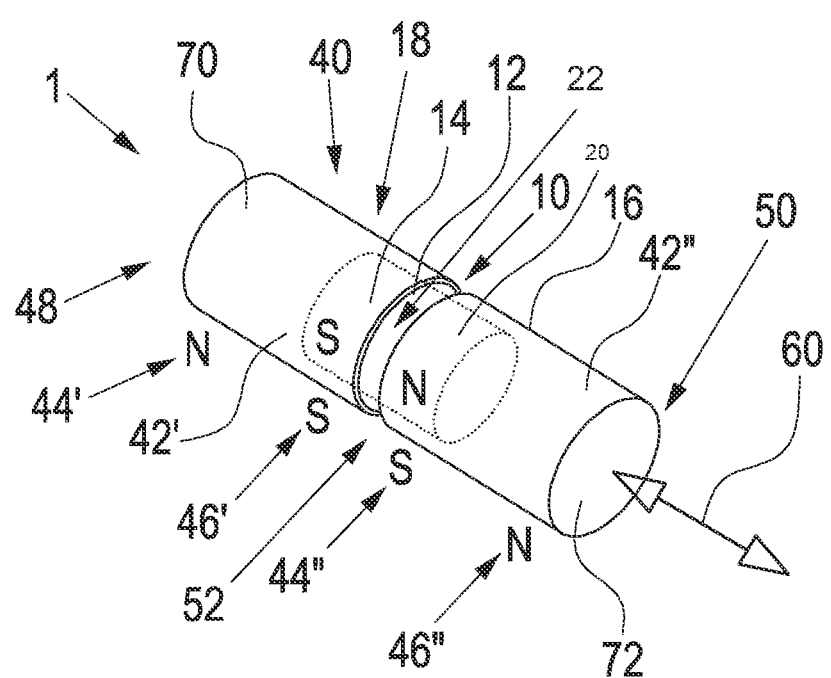
Figure 6:
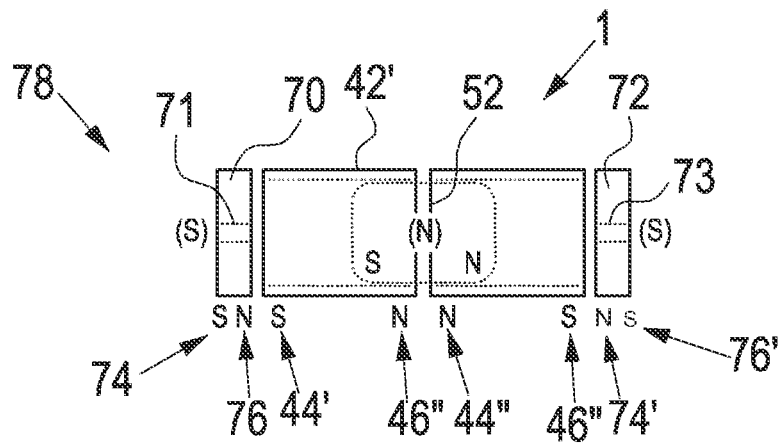

FIG. 5 shows another embodiment of the inventive electromagnetic linear actuator, this embodiment substantially corresponding to the embodiment from FIG. 2. In contrast to the embodiment from FIG. 2, the electromagnetic linear actuator 1 from FIG. 5 comprises two end elements 70, 72. The end element 70 is implemented here as a cover and connected, preferably integrally, to the electromagnet 42' on the side shown on the left. Electromagnet 42' and cover 70 accordingly form a coil pot. In a corresponding manner, the end element 72 is implemented with electromagnet 42". As can be seen in FIG. 6, the end element 70 comprises an electromagnet 71, realized as a coil. The electromagnet 71 is magnetized such that the end element 70 comprises a south pole 74 shown on the left side and a north pole 76 shown on the right side. The end element 70 accordingly has the same polarity as the electromagnet 42', so that the north pole 76 of the end element 70 is located opposite the south pole 44' of the electromagnet 42'. Due to the existing magnetization of the electromagnetic linear actuator 1, this comprises a virtual south pole 78 on the left side (and right side). If a change in magnetization of the electromagnets 42', 42" occurs (following FIG. 4), then a change of magnetization of the electromagnets 71, 73 takes place synchronously, so that the poles 74, 76, 44', 46', 44", 46", 74', 76' each have the reverse pole.

Here and also in other embodiments with at least one end element, only a change in magnetization of the electromagnets 71, 73 of the end elements 70, 72 or the electromagnets 42', 42", in particular in hollow cylinder form, is possible apart from the synchronous change of magnetization.

Figure 7A:
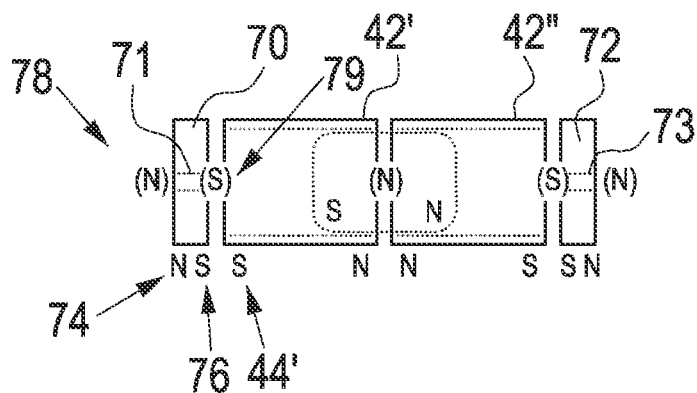

The embodiment from FIG. 7a substantially corresponds to the embodiment from FIG. 6 (and FIG. 5). In contrast to the embodiment from FIG. 6, however, the embodiment from FIG. 7a comprises an end element 70 with electromagnet 71 wherein the end element 70 has the opposite polarity to the electromagnet 42'. Thus with reference to end element 70 and electromagnet 42', two identical poles, namely south pole 76 of the end element 70 and south pole 44' of the electromagnet 42', lie opposite one another. Due to the magnetization of the electromagnetic linear actuator 1 from FIG. 7a, this has a virtual north pole 78 on the left side (and right side). Furthermore, located between the end element 70 and the electromagnet 42' (as well as the end element 72 and the electromagnet 42") is a virtual south pole 79.

The embodiment from FIG. 7a differs from the embodiment in FIG. 6 in the end effect in particular on account of the active inner virtual poles at the end elements, wherein shown here are south poles. In the embodiment from FIG. 7a, this leads to a slightly lower effect level compared with the embodiment from FIG. 6. With maximal displacement of the oscillator 10, however, this can be advantageous if the maximal displacement cannot be achieved, for example, e.g. due to at least one damper (see FIGS. 8a-8c).

Figure 7B:
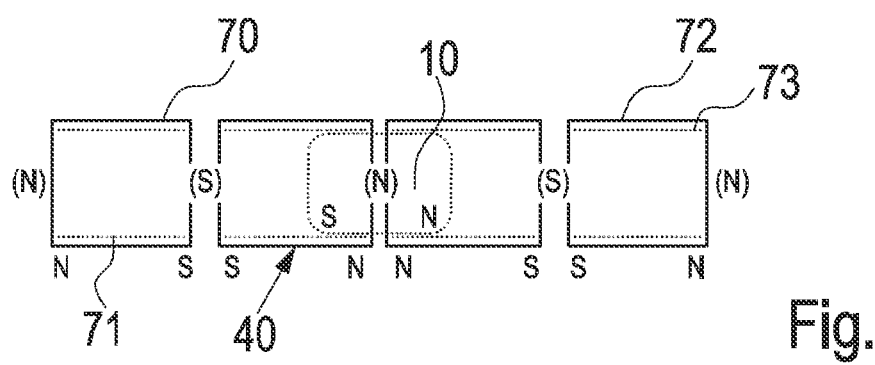

The embodiment from FIG. 7b substantially corresponds to the embodiment from FIG. 7a. In contrast to the embodiment from FIG. 7a, the end element 70 from FIG. 7b is realized not as a cover, but as a hollow cylinder 70 with coil 71. In a relative movement between oscillator 10 and stator 40, the oscillator 10 can consequently move out of the stator 40, at least partially, and enter the end element 70.

The effect level of the variants with at least one end element 70 in hollow cylinder form (for example, FIG. 7b) is substantially smaller than embodiments with an end element in cover form (for example, FIG. 7a). The design permits very simple assembly, however, due to the open configuration and in particular due to a uniform inner diameter. In addition, a soft oscillation of the oscillator 10 without additional damping is facilitated.

Figure 7C:
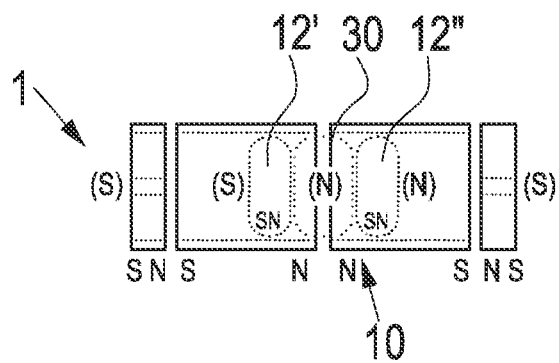

The embodiment from FIG. 7c substantially corresponds to the embodiment from FIG. 6 (and FIG. 5). In contrast to the embodiment from FIG. 6, the oscillator 10 comprises not only one permanent magnet 12, but two permanent magnets 12', 12". An iron core 30 is arranged between the two permanent magnets 12' and 12" to optimize the magnetic force.

Figure 7D:
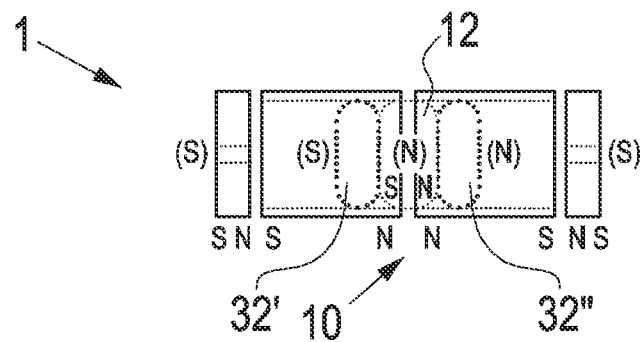

The embodiment from FIG. 7d substantially corresponds to the embodiment from FIG. 6 (and FIG. 5). In contrast to the embodiment from FIG. 6, the permanent magnet 12 from FIG. 7d, which is implemented in a smaller width in particular, comprises an iron casing in the form of two iron casing elements 32', 32" on both sides. The magnetization can be optimized hereby.

The ferrite cores (for example, of FIG. 7c and FIG. 7d) make it possible in particular to realize cost-effective centrifugal masses.

Figure 7E:
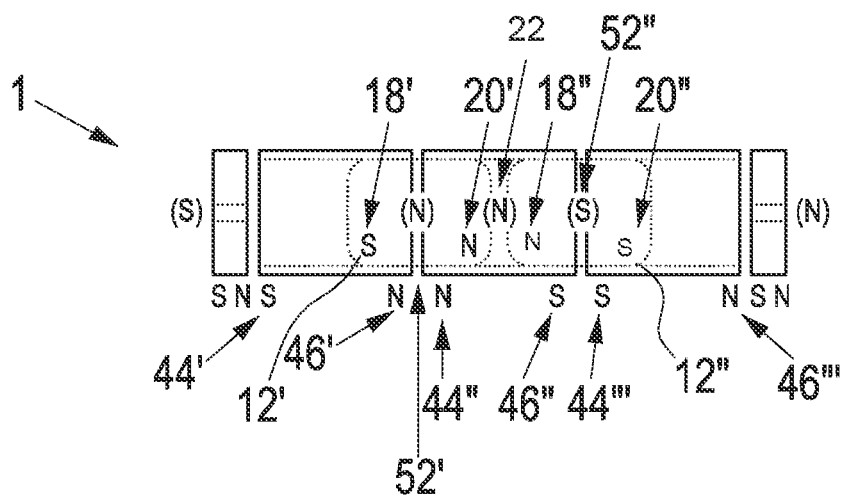

The embodiment from FIG. 7e comprises three electromagnets 42', 42''' arranged coaxially in series, wherein the electromagnet 42' is implemented with opposite polarity to the electromagnet 42" and the electromagnet 42" is implemented with opposite polarity to electromagnet 42'''. Lying opposite one another between electromagnet 42' and electromagnet 42" are the identical stator poles 46', 44", which are each north poles. With regard to electromagnets 42", 42''', the identical opposing stator poles 46", 44''' are south poles. There accordingly exists between electromagnets 42', 42" a virtual north pole at point 52' and between electromagnets 42", 42''' a virtual south pole at point 52". The oscillator 10 comprises two permanent magnets 12', 12" of opposite polarity, which are preferably fixed to one another. In the embodiment depicted, two north poles consequently lie opposite one another at the oscillator poles 20', 18" between the permanent magnets 12', 12", due to which a virtual oscillator pole realized as a north pole exists at point 22.

Figure 7F:
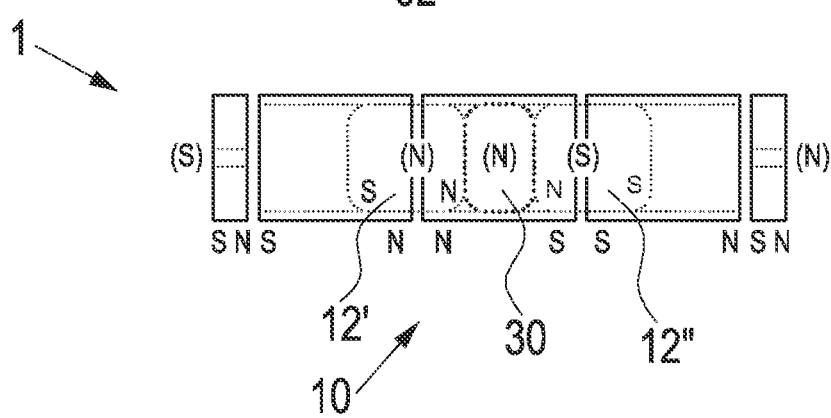

The embodiment from FIG. 7f substantially corresponds to the embodiment from FIG. 7e. In contrast to the embodiment from FIG. 7e, the embodiment from FIG. 7f comprises an iron core 30 between the two permanent magnets 12', 12" for adjusting the magnetization.

Figure 7G:
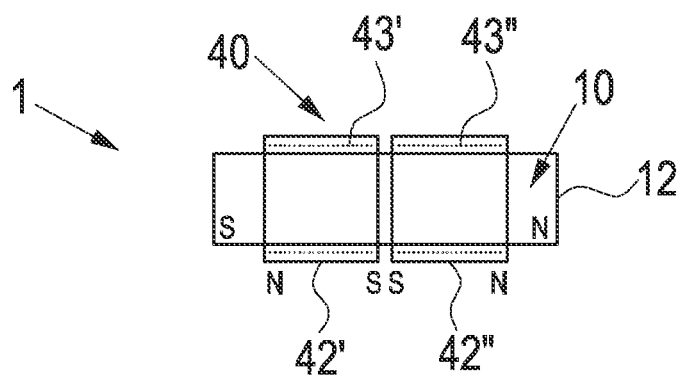

The embodiment from FIG. 7g substantially corresponds to the embodiment from FIG. 3 (and FIG. 2). In contrast to the embodiment from FIG. 3, the oscillator 10 from FIG. 7g comprises a permanent magnet 12, the width of which is greater than the width of the stator 40 or the external spacing of the electromagnets 42', 42". The oscillator 10 accordingly protrudes from the stator 40 on both sides.

Figure 8A:
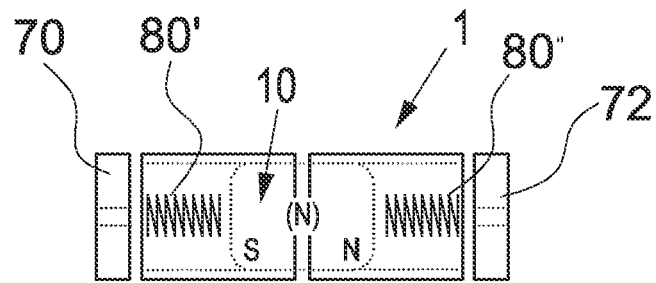

In the embodiment from FIG. 8a, the electromagnetic linear actuator 1 comprises a vibration-damping device consisting of two vibration dampers 80', 80". In the embodiment depicted, these are two spring elements 80', 80", which damp the movement of the oscillator 10 relative to the stator 40. It is possible that the vibration damper 80' (and/or the vibration damper 80") is mounted on, in particular attached to, the end element 70 (72) and/or the oscillator 10 and/or the stator 40. It is also possible that the vibration damper 80' (and the vibration damper 80"), is just arranged, for example loosely, between end element 70 (72) and oscillator 10. Moreover it is possible that the vibration damper 80' (and the vibration damper 80") is spaced at a distance from the end element 70 (72) and/or from the oscillator. It is also possible that a vibration damper is only arranged on one side. This option of a purely unilateral arrangement likewise applies to the embodiments from FIGS. 8b and 8c.

Figure 8B:
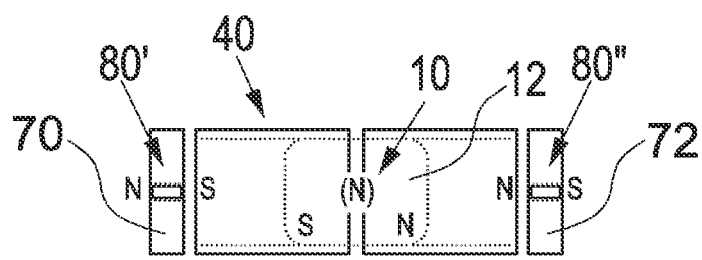

In contrast to the embodiment from FIG. 8a, the embodiment from FIG. 8b comprises no springs as vibration dampers, but magnetic dampers 80', 80" in the end elements 70', 72. The magnetic dampers 80', 80" interact with the magnetic field of the permanent magnet 12 of the oscillator 10 to damp the movement of the oscillator 10 relative to the stator 40.

Figure 8C:
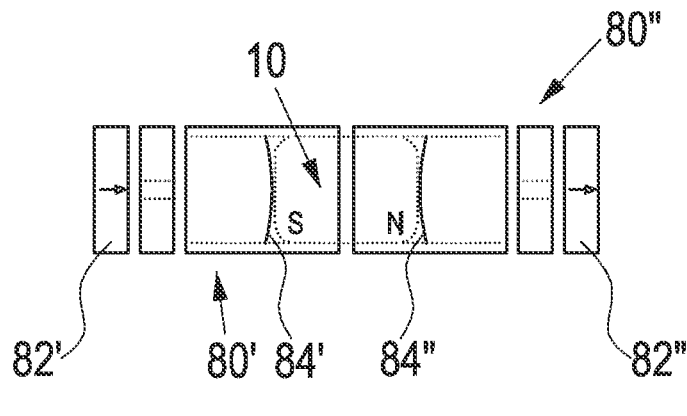

In contrast to the embodiment from FIG. 8b, the embodiment from FIG. 8c comprises no magnetic dampers, but compressed air dampers 80', 80". In the embodiment shown, the compressed air dampers 80', 80" have valves 82', 82" as well as membranes 84', 84" associated with the oscillator 10. Between valve 82' and membrane 84' (as well as between valve 82" and membrane 84") there exists compressed air, for example, which ensures damping of the movement of the oscillator 10 relative to the stator 40. The valves 82', 82" are preferably realized adjustably in this case, so that variable damping can take place.

Figure 8D:
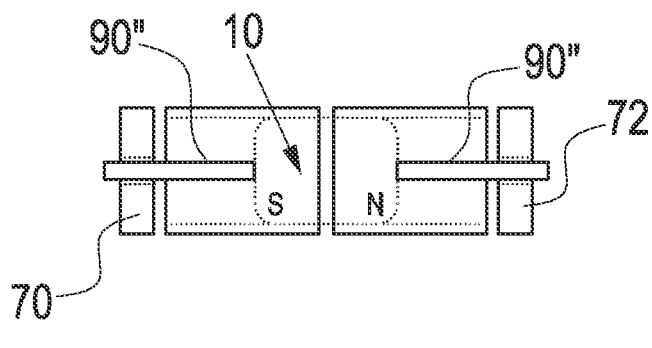

The embodiment from FIG. 8d shows push rods 90', 90" on both sides of the oscillator 10 and connected thereto. Starting out from the oscillator 10, the push rod 90' extends through an opening of the end element 70. The push rod 90" extends, starting out from the oscillator 10, through an opening of the end element 72. It is possible in this way to transmit a mechanical movement of the oscillator 10 to the environment of the electromagnetic linear actuator. A force from the push rod can be decreased hereby in the environment, for example, and/or damping undertaken by means of a damping device, not shown, in the environment of the electromagnetic linear actuator. It is possible that only a single push rod 90', 90" is provided.

FIGS. 9a to 9d show other preferred embodiments of the inventive electromagnetic linear actuator 1. In contrast to FIGS. 1 to 8, the linear actuator in FIGS. 9a to 9d (and FIGS. 10a, 10b, 11a and 11b) does not substantially have a circular cylindrical shape, but a rectangular cylinder shape. Accordingly the oscillator 10 and the stator 40 likewise have substantially a rectangular hollow cylinder shape.

Figure 9A:
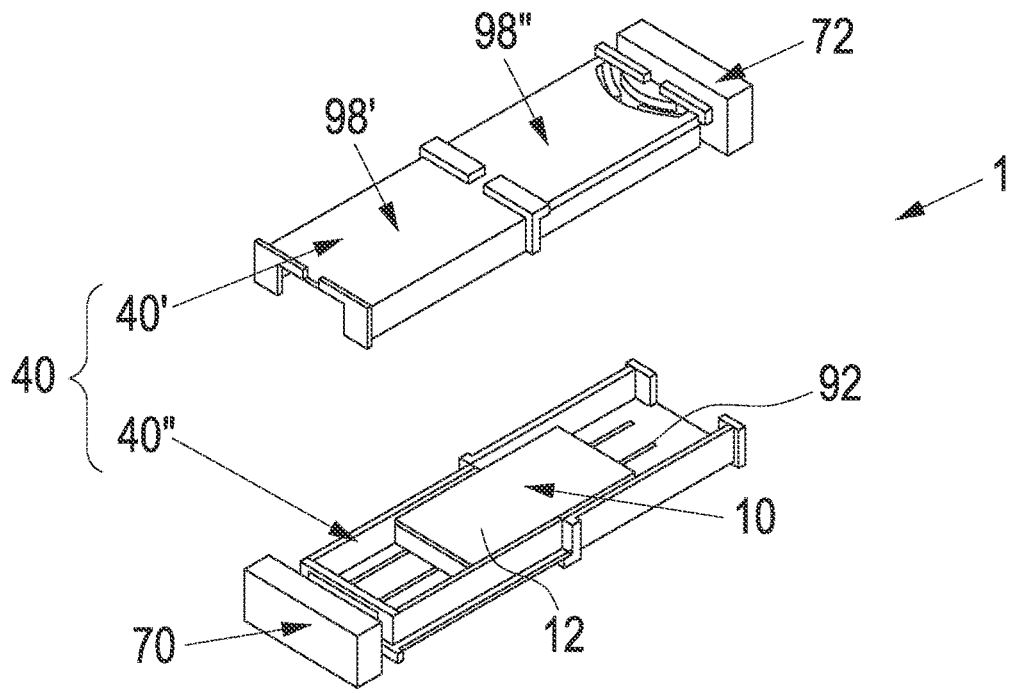

FIG. 9a shows a stator 40, which consists substantially of two elements, which are substantially hollow, rectangular half-cylinders 40', 40". The half-cylinders 40', 40" are implemented identically in this case. Each half-cylinder 40', 40" has substantially two rectangular shell shapes 98', 98" of different sizes. At one end face the half-cylinders 40', 40" are preferably open, wherein they are preferably closed at the other end face. At this closed end, the half-cylinders 40', 40" are each connected to an end element 70, 72, preferably integrally (see FIG. 9d in I). The end element 70 (and the end element 72) preferably have a T-shaped cross section here. The longitudinal member 96 of the T-shape is connected in this case to the half-cylinder 40" and comprises a transverse member 94 at the other end.

Figure 9B:
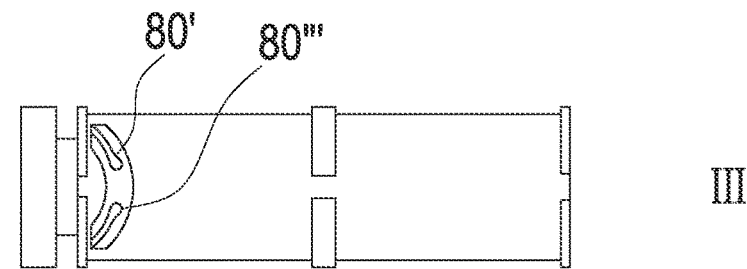
Figure 9B:
Figure 9B:
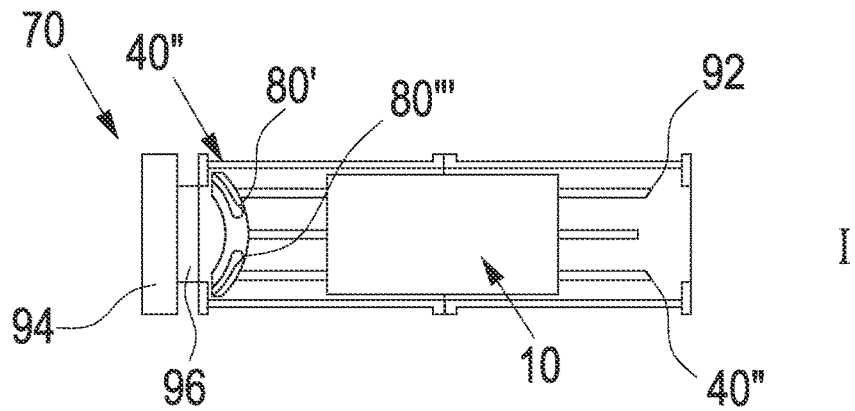
Figure 9C:
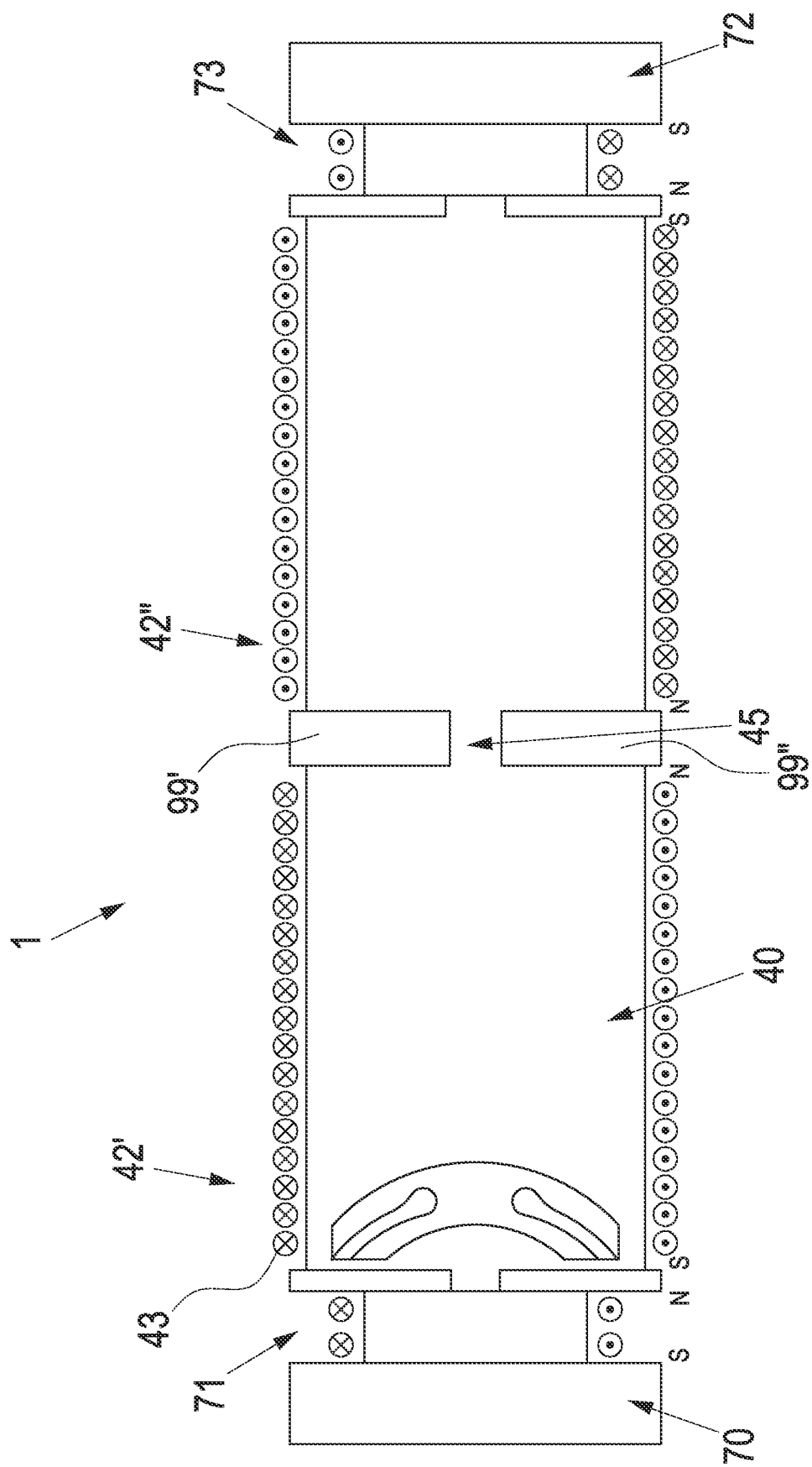

To form the linear actuator, the two half-cylinders 40' 40" are connected to one another, as indicated in FIG. 9, by plug-in connection of the twisted half-cylinders 40', 40" (see FIG. 9c).

The oscillator 10 is arranged so as to be linearly movable in the inner cavity of the stator 40. To minimize friction in particular as well as to permit air circulation in the interior, the stator 40 has a rib profile on the inner shell surface with ribs 92 running longitudinally. The oscillator 10 can slide along on these ribs 92.

The oscillator 10 comprises a permanent magnet 12 and preferably consists thereof. The permanent magnet 12 is in particular a linear-magnetized permanent magnet.

FIG. 9b shows various views of the half-cylinder 40" with oscillator 10 from FIG. 9a arranged therein.

I shows a plan view. II shows a side view and III shows a rear view.

In I, a vibration-damping device consisting of two vibration dampers 80', 80" can be seen, which device is connected on one side of the half-cylinder 40", in particular integrally. The vibration-damping device is located in particular in the region of the end element 70. The vibration-damping device comprises two flexible arms 80', 80". In the event of a movement of the oscillator 10 and an impact of the oscillator 10 on the flexible arms 80', 80", these yield flexibly in a longitudinal direction and thus damp the oscillator 10 and emit a pulse in particular to the stator 40. It is possible by means of several pulses to produce a vibration by means of the linear actuator 1. Due to the identical configuration of the half-cylinders 40', 40" and the opposed plugging together, the stator 40 comprises vibration dampers at both longitudinal ends, so that when the oscillator 10 oscillates back and forth inside the stator 40, damping and/or pulse transmission takes place on both sides.

FIG. 9c shows a plan view of the assembled linear actuator 1 from FIG. 9a.

FIG. 9c depicts schematically magnets 71, 73 of the end elements 70, 72 as well as stator magnets 42', 42". These magnets 71, 73, 42', 42" are formed by a single coil 43 and are thus in particular integral.

The coil 43 is wound here over the end elements 70, 72 and the stator 40. In particular, the coil winding begins at an end element 70 or 72, runs across the stator 40 and ends at the other end element 70, 72.

The winding direction of the coil 43 is depicted schematically by means of the X-representation and the point representation. In the area of the end element 70 (shown on the left) and in the area of the left half of the stator 40, the coil is wound in the same direction, so that magnet 71 of the end element 70 and magnet 42' have the same polarity. In the middle of the linear actuator 1 and of the stator 40 a change of direction of the winding of the coil 43 takes place in winding reversal 45 (see also FIG. 9d). The winding change takes place as depicted between the struts 99', 99", it being preferable to bend the coil 43 in this case around one of the struts 99" (see FIG. 9d). Opposed winding of the coil 43 accordingly takes place on the right-hand half of the linear actuator. This results in the two magnets 42', 42" of the stator 40 having opposite polarity to one another. An exemplary first magnetization state of the coil 43 and thus of the magnets 71, 73, 42', 42" is shown by way of the letters S, N.

Figure 9D:
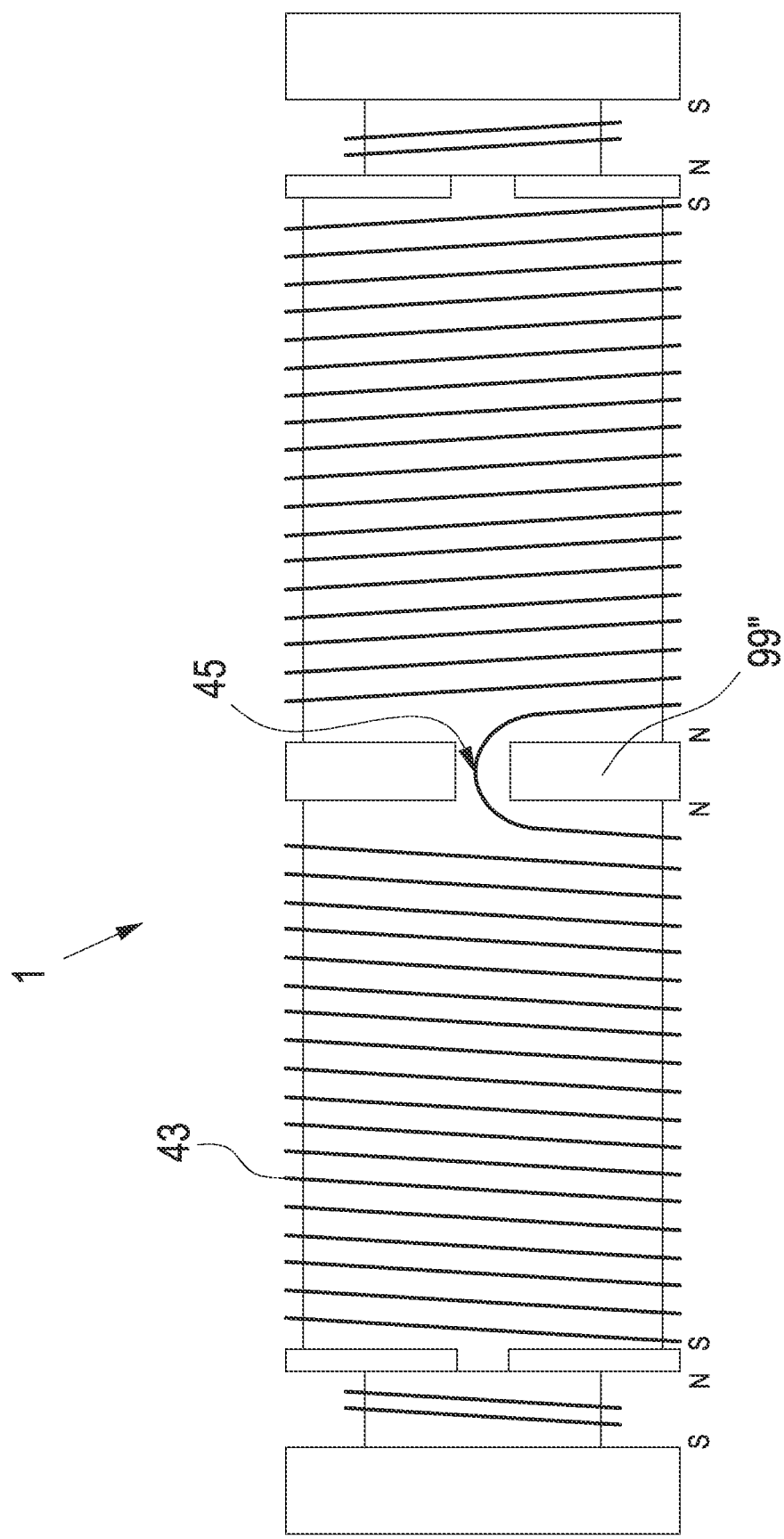

FIG. 9d shows another depiction of the linear actuator 1 based on FIG. 9c (wherein the vibration damper was omitted for reasons of clarity, however). FIG. 9d shows schematically the winding of the coil 43 and the change of winding direction in point 45 about the strut 99".

With the implementation from FIGS. 9a to 9d, an implementation of the four magnets 71, 73, 42', 42" including central opposite polarity is advantageously realized by means of just one coil 43.

Figure 10A:
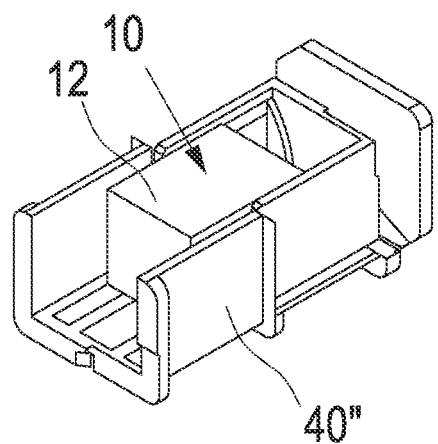
Figure 10B:
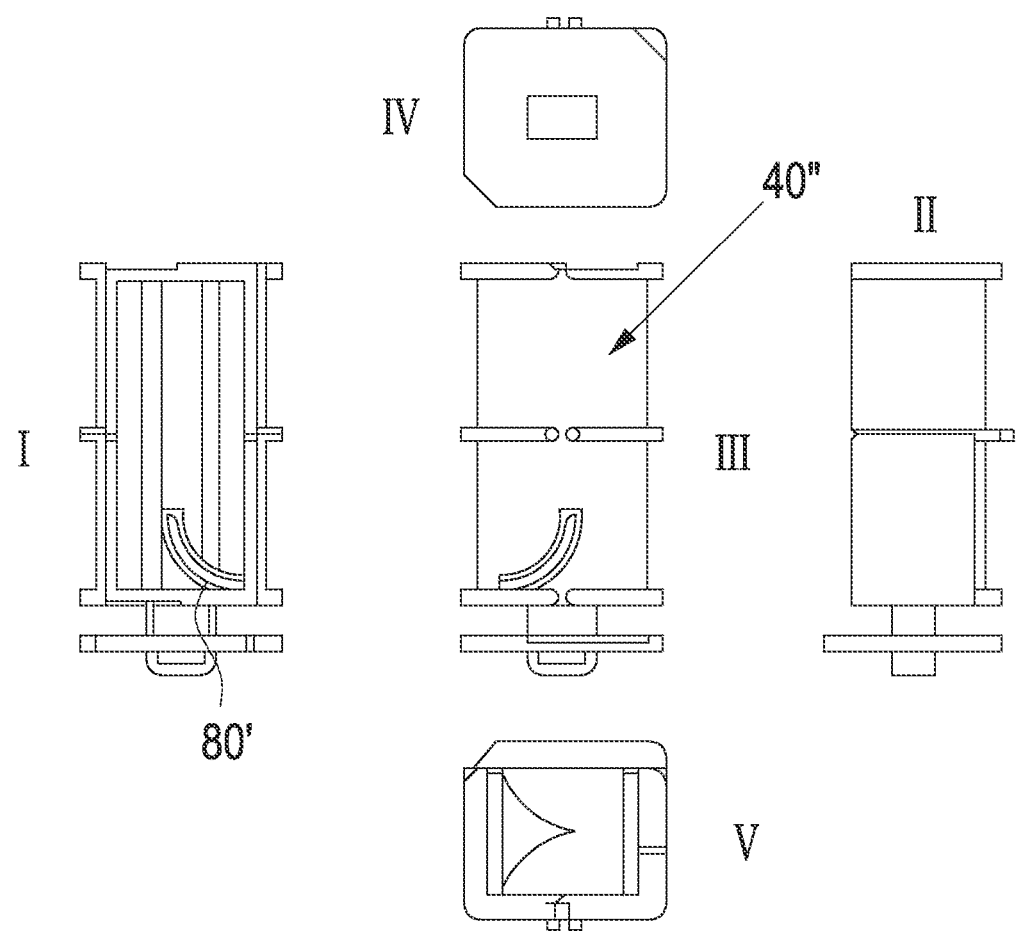

FIGS. 10a and 10b show another embodiment of the inventive linear actuator 1, wherein the implementation substantially corresponds to the implementation from FIGS. 9a to 9d. The embodiments differ in this case in particular due to the form of the oscillator 10 as well as of the stator 40, wherein the linear actuator 1 from FIGS. 9a to 9d is flatter than that in FIGS. 10a to 10d, or is of a smaller height.

Moreover, the embodiments also differ in that only one flexible arm 80' for vibration damping is formed on one side, preferably integrally, with the half-cylinder 40".

FIG. 10b shows the following views:

I plan view, II side view, III view from underneath, IV front view and V rear view. Preferred dimensions are shown in FIG. 10b. These dimensions are only dimensions by way of example, however, which can also be removed (from the fig.).

Figure 11A:
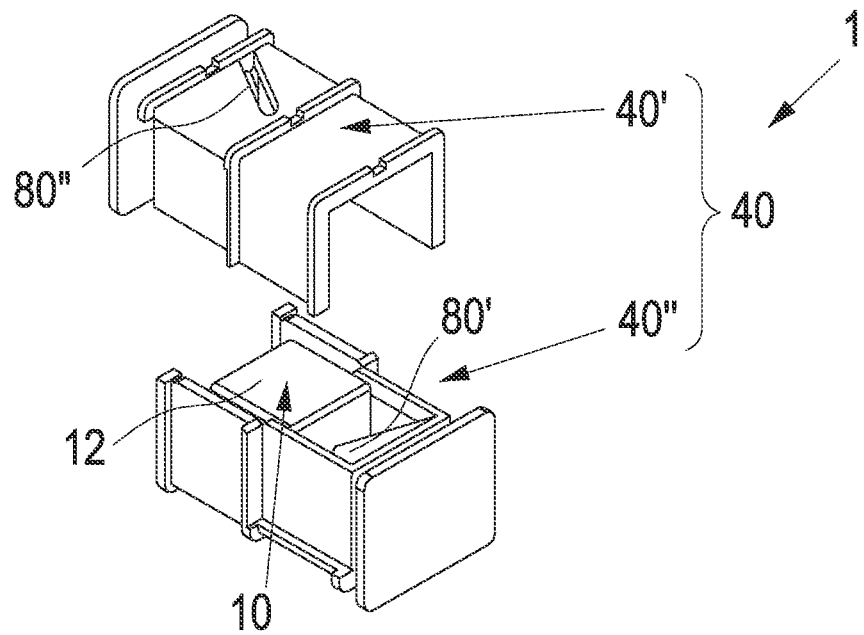
Figure 11B:
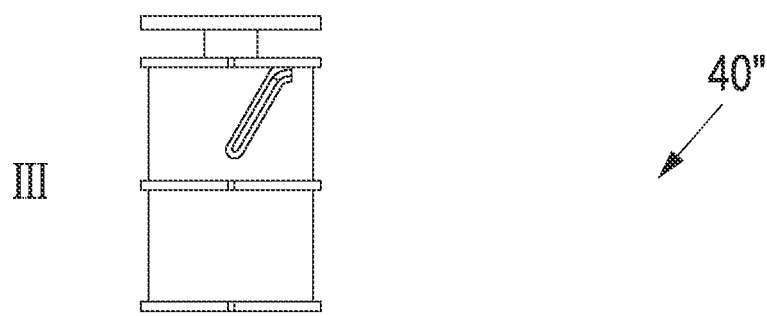
Figure 11B:
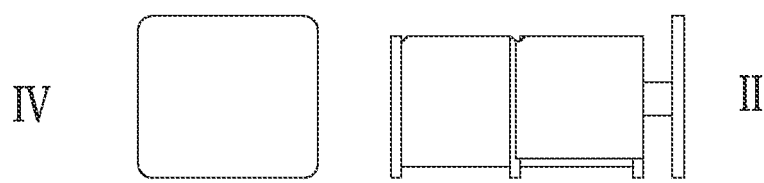
Figure 11B:
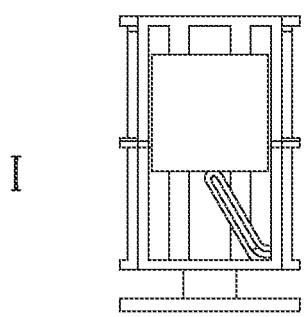

FIGS. 11a and 11b show another embodiment of a linear actuator 1 according to the invention. This embodiment corresponds here substantially to the embodiment from FIGS. 10a and 10b, wherein (once more) another form exists with regard to the oscillator 10 and the stator 40. This is substantially a squarer shape compared with the implementation in FIGS. 10a and 10b.

The invention claimed is:

1. An electromagnetic linear actuator comprising:
    a first element and a second element,
    wherein the first element is a magnetic oscillator with at least one magnet and the second element is a magnetic stator with at least one electromagnet magnet,
    wherein the two elements are movable relatively linearly to one another,
    wherein the directions of magnetization of the oscillator and of the stator are parallel, preferably lying inside one another,
    wherein the stator comprises at least two electromagnet magnets of opposite polarity arranged in series, such that the stator comprises two opposing identical stator poles; and
    at least one end element, wherein the second element comprises the at least one end element on each side of the second element, wherein the at least one end element comprises at least one, axially magnetized magnet, and the at least one axially magnetized magnet comprises an electromagnet having an alternating polarity.

2. The electromagnetic linear actuator according to claim 1, comprising a permanent change in the magnetization of the stator or the oscillator to produce the relative movement between the oscillator and the stator.

3. The electromagnetic linear actuator according to claim 1, wherein the first element is arranged, at least partially, inside the second element.

4. The electromagnetic linear actuator according to claim 1, wherein the first element is substantially cylindrical in the form of a circular cylinder, wherein the first element has an axial magnetization.

5. The electromagnetic linear actuator according to claim 1, wherein the second element is substantially formed as a hollow cylinder, comprising a hollow circular cylinder or hollow rectangle, wherein the second element comprises an axial magnetization.

6. The electromagnetic linear actuator according to claim 1, wherein the second element comprises two connected, plugged, half-cylinders 40' and 40", respectively.

7. The electromagnetic linear actuator according to claim 1, wherein the at least one magnet of the, at least one oscillator is a permanent magnet in the form of a rod magnet.

8. The electromagnetic linear actuator according to claim 1, wherein the second element comprises at least two magnets in the shape of a hollow cylinder in the shape of a hollow circular cylinder, arranged one end to another end coaxially with one another.

9. The electromagnetic linear actuator according to claim 1, wherein the at least one magnet of the end element is respectively of the same or opposite polarity to the pole of the element on which the end element is arranged.

10. The electromagnetic linear actuator according to any claim 1, comprising a vibration-damping device for vibration damping of the first element relative to the second element.

11. The electromagnetic linear actuator according to claim 1, comprising a push-rod device, connected to the first element, for transmission of a force from the electromagnetic linear actuator to the environment.

12. The electromagnetic linear actuator according to claim 1, wherein the first element and/or the second element comprises:
    at least one iron core, and/or
    at least one, at least partial, iron casing.

13. The electromagnetic linear actuator according to claim 1, wherein the oscillator or the stator comprises one single coil with a change of winding direction for producing two opposing identical stator poles or two opposing identical oscillator poles.

14. The electromagnetic linear actuator according to claim 1, wherein either the stator comprises two identical stator poles on both sides externally, or the oscillator comprises two identical oscillator poles on both sides externally.

15. A method for producing a mechanical movement in the form of a vibration, by means of an actuator, wherein the actuator comprises:
    a first element and a second element,
    wherein the first element is a magnetic oscillator with at least one magnet, and
    the second element is a magnetic stator with at least one magnet, wherein the magnetization directions of the oscillator and the stator are parallel, lying inside one another, comprising:
    a magnetization of the stator, wherein the stator comprises at least two electromagnet magnets of opposite polarity arranged in series, such that the stator comprises two opposing identical stator poles, or
    a magnetization of the oscillator such that the oscillator has two opposing identical oscillator poles; and
    at least one end element, wherein the second element comprises the at least one end element on each side of the second element, the at least one end element comprises at least one, axially magnetized magnet, and the at least one axially magnetized magnet comprises an electromagnet having an alternating polarity.

\* \* \* \* \*